Patented Jan. 12, 1954

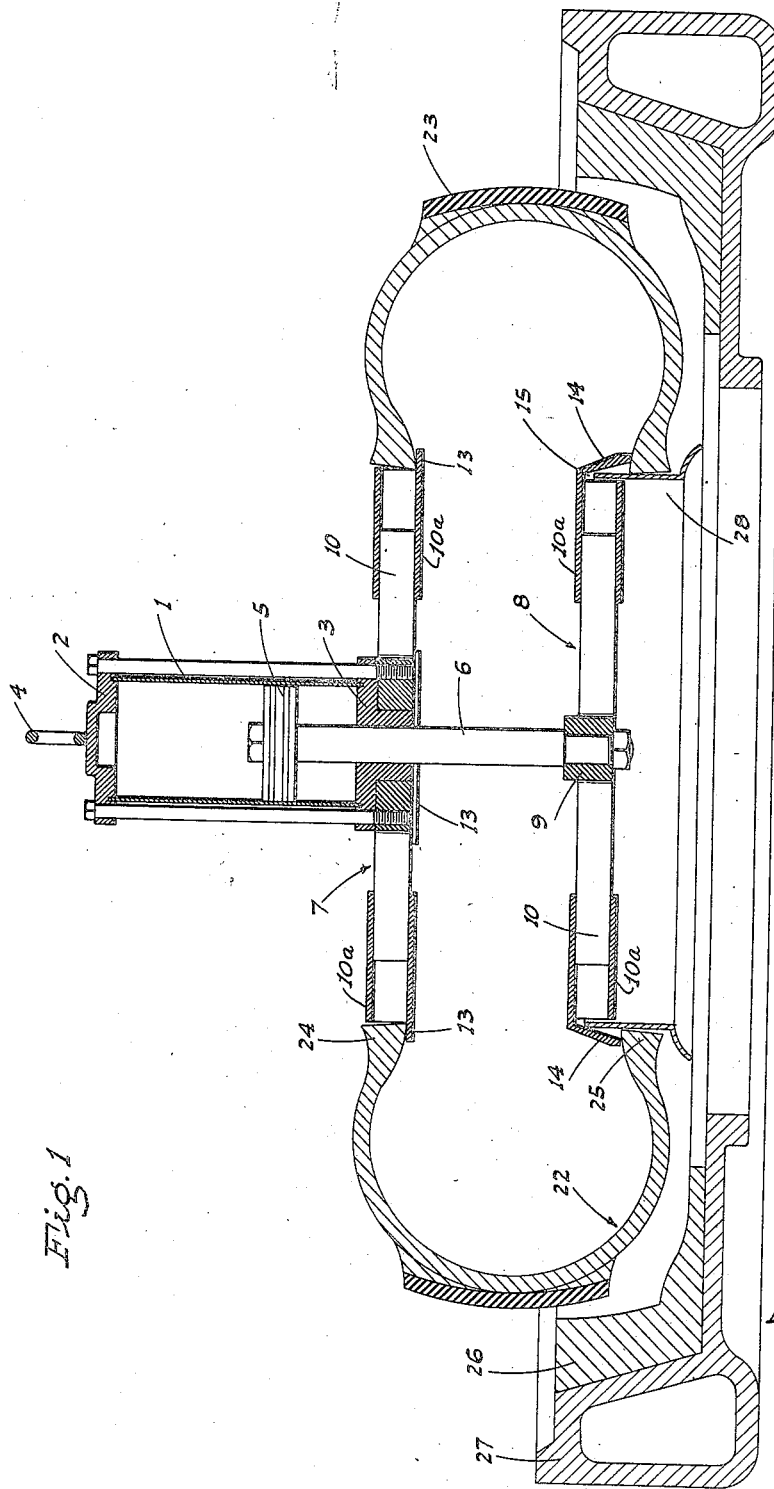

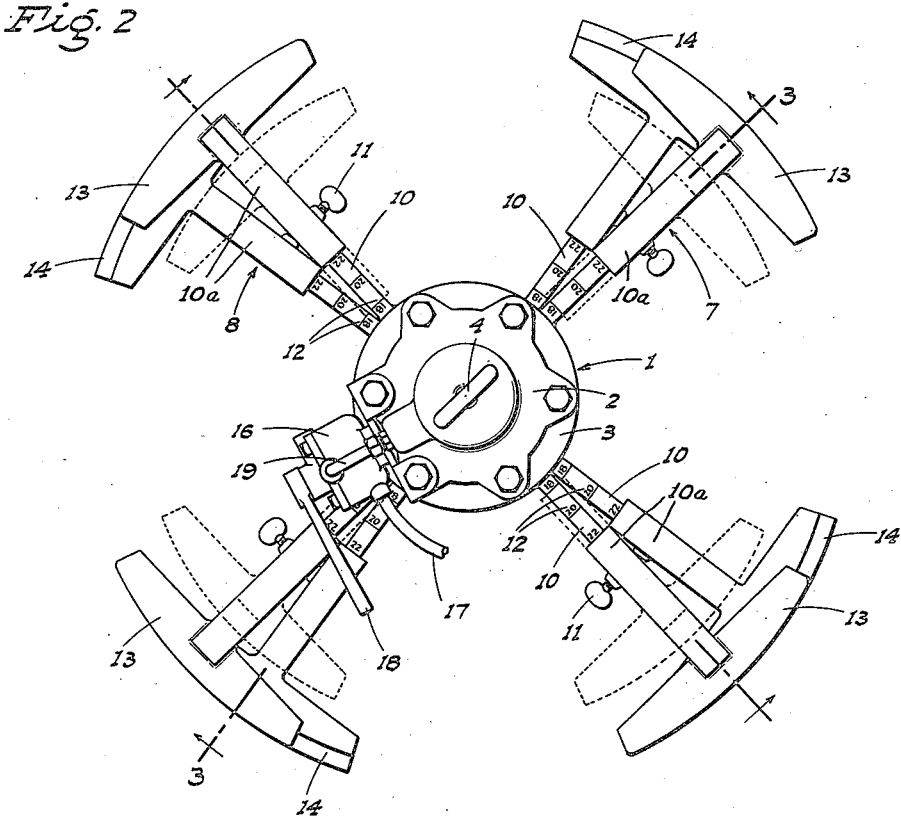
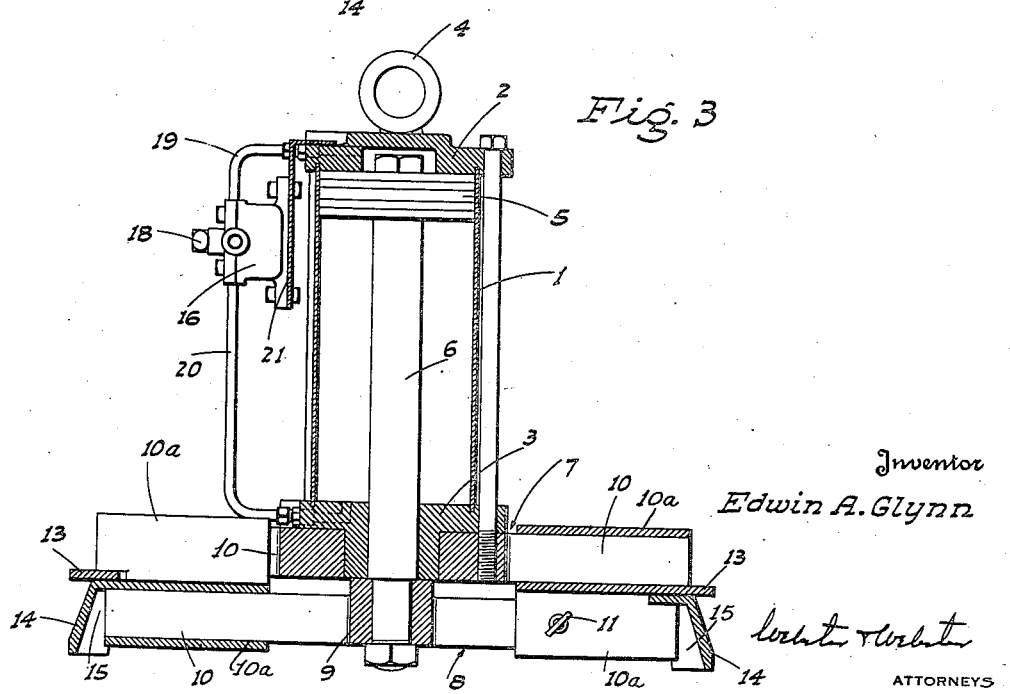

2,665,883

UNITED STATES PATENT OFFICE 2,665,883

TIRE MANIPULATING DEVICE

Edwin A. Glynn, Lodi, Calif., assignor to Super Mold Corporation of California, Lodi, Calif., a corporation of California Application August 28, 1950, Serial No. 181,826

1 Claim. (Cl. 254—50.3)

This invention relates in general to the art of tire retreading; the term "retreading" as used herein being intended to include tread replacement by top capping, full capping, or full retreading.

In retreading tires, especially those of large size, it is difficult—under ordinary practice—to insert the tire in the open circular half of the mold which includes a matrix half to initially receive said tire, and equally difficult to remove the tire therefrom after vulcanization; both by reason of the fact that the tire fits tightly in place in each instance. The unvulcanized new tread material causes the tight fit in the matrix at the outset, and the molded tread portion makes tire removal from the matrix difficult after the retreading operation is completed.

The present invention provides, as a major object, a device capable of reducing the effective diameter of the tire whereby to facilitate insertion or removal of the tire from the aforesaid open circular half of the mold and the matrix included therein; the device not only reducing the tire diameter, but engaging the same in supporting relation so as to facilitate manipulation of the tire to position in or to remove it from the mold.

The invention further provides, as an important object, a device as above which includes novel, power actuated mechanism operative to engage and axially separate the tire beads; such separation having the effect of reducing the overall diameter of the tire.

An additional object of the invention is to provide a device, as in the preceding paragraph, wherein said mechanism embodies axially alined spiders having bead engaging elements on the outer ends of the spider arms, and a power cylinder connecting said spiders in a manner to cause forceful relative axial separating motion thereof, whereby to spread the engaged tire beads and reduce the effective diameter of the tire.

It is also an object of the invention to provide a tire manipulating device which is designed for ease and economy of manufacture; the device being simple in structure but sturdy, and convenient to operate.

Still another object of the invention is to provide a practical and reliable tire manipulating device, and yet one which will be exceedingly effective for the purpose for which it is designed.

These objects are accomplished by means of such structure and relative arrangement of parts as will fully appear by a perusal of the following specification and claim.

In the drawings:

Fig. 1 is a sectional elevation of the device as in use with a tire; the tire beads being spread and the tire shown part way in the somewhat diagrammatically shown, circular lower half of a retreading mold.

Fig. 2 is a top plan view of the device; the upper and lower spiders being slightly circumferentially offset for the purpose of illustrating both.

Fig. 3 is a sectional elevation of the device, with the spiders as in starting or engaged position.

Referring now more particularly to the characters of reference on the drawings, the tire manipulating device comprises an upstanding, fluid pressure energized cylinder of double-acting type, indicated generally at 1; such power cylinder including an upper end head 2, and a lower end head 3. The upper end head 2 is fitted with a lift eye 4 adapted to connect with the hoist which retreading molds conventionally include above the latter.

A piston 5 travels in the cylinder, and a piston rod 6 projects downwardly from the piston 5 through the lower end head 3.

The lower end head 3 provides the hub or support for the upper spider, indicated generally at 7, while a lower spider, indicated generally at 8, is secured by means of a hub 9 to the outer end of the piston rod 6. With this arrangement the upper and lower spiders 7 and 8, respectively, are horizontally disposed in axial alinement, but relatively rotatable.

Each of the spiders includes a plurality of equally circumferentially spaced spider arms 10. These arms are of constant cross sectional size throughout their length and include sleeves 10a adjustably slidable thereon and projecting from the outer end thereof. Each sleeve is maintained in adjusted position on its arm by a thumb screw 11, and said arm being scaled, as at 12, for tire size.

The spider sleeves 10a of the upper spider 7 are fitted, at their outer ends and on the under side, with segmental, outwardly projecting bead engaging flanges 13, and the spider sleeves 10a of the lower spider 8 are formed, at their outer ends, with segmental bead engaging flanges 14 which project at an outward and downward incline from the top of the corresponding arm, whereby to form a notch-like opening 15 at the outer end of the corresponding sleeve, for the purpose which will hereinafter appear.

The power cylinder 1 is adapted to be reversibly actuated by means of a reversing valve 16 fed with fluid pressure from a flexible conduit 17, and which valve includes an operating handle 18. Conduits 19 and 20 lead from opposite sides of the reversing valve 16 to corresponding ends of the power cylinder 1. With operation of the reversing valve 16, fluid pressure can be fed selectively to either end of the power cylinder and vented from the opposite end. The reversing valve 16 is mounted in connection with the power cylinder by means of a bracket 21, so that said valve is readily manually accessible at all times.

The numeral 22 indicates generally the tire to be retreaded, such tire having the new tread material or camelback 23 thereon, and the tire including upper and lower beads 24 and 25, respectively.

The purpose of the herein described tire manipulating device is to facilitate insertion of the tire 22 in the lower matrix half 26 which is carried in the lower circular half 27 of the retreading mold; such matrix half 26 and lower circular half 27 of the mold being exposed from above when the latter is open.

As the tire 22 with the camelback 23 thereon has a very tight fit in the lower matrix half 27, it is difficult to insert the tire prior to vulcanization, and to remove it after the retreading process is completed.

To aid in such insertion and removal of the tire, the described tire manipulating device is brought into play; the piston 5 being initially retracted so that the spiders 7 and 8 are close together, as in Fig. 3.

With the sleeves 10a adjusted to length on the spider arms, the top bead engaging flanges 13 are engaged under the upper bead 24 of the tire, while the lower bead engaging flanges 14 are engaged on the lower bead 25 of said tire; i. e. both beads are engaged inside.

The power cylinder 1 is then actuated to advance the piston 5 and piston rod 6, which results in forceful separation of the spiders 7 and 8, together with the engaged beads 24 and 25; the separation being greater than the normal spacing between said beads. With such abnormal spacing of the beads 24 and 25, there is a resultant reduction in the outside diameter of the tire 22, so that such tire may then be lowered by the eye 4 and hoist into the matrix 26 without sticking or binding.

The notch-like openings 15 which exist between the outer ends of the sleeves 10a of the lower spider 8 is for the purpose of permitting the lower bead 25 to engage about the lower half 28 of a two-part curing rim, and so as to readily locate the device on the tire. A rim of this character is shown in U. S. Patent No. 2,077,506, and the other half of the curing rim (not shown) is positioned in the tire after the latter is engaged in the lower matrix half 26.

After the tire has been reduced in effective outside diameter by spreading of the beads, and engaged in the lower matrix half 26, the power cylinder 1 is reversed in operation, retracting the piston rod 6, and returning the spiders 7 and 8 to their closely adjacent position, whence they are removed from the tire preparatory to closing of the mold.

After the retread operation is completed, the tread design as vulcanized into the camelback 23 tends to cause the tire to stick in the lower matrix half 26, and here again the described tire manipulating device comes into play to facilitate removal of the tire.

To remove the tire from the lower matrix half, the above described operation, with respect to insertion of the tire, is merely repeated but in reverse.

When in use the device is properly centered in the tire, by reason of the fact that the outer ends of the sleeves 10a of the upper spider 7 abut against the base of the upper bead 24 at circumferentially spaced points.

With the described tire manipulating device, vehicle tires—especially of large heavy-duty size—may be readily and conveniently inserted in or removed from a tire retreading mold.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent are desired:

A device for spreading the beads of a horizontally disposed tire comprising upper and lower axially separable radial units adapted to aline with the inner faces of the corresponding tire beads, power means connected to said units to cause relative separation thereof whereby to increase the spacing of the tire beads when engaged by the units, the upper unit including means to engage the upper bead in lifting relation; and the lower unit including a plurality of circumferentially spaced radial arms adapted to terminate adjacent the base of the lower tire bead, and annular flanges depending from the upper edge of said arms to engage the upper surface of the lower tire bead; said annular flanges being spaced radially out from the outer end of said arms and forming downwardly opening notches therewith.

EDWIN A. GLYNN.

References Cited in the file of this patent

UNITED STATES PATENTS

| Number | Name | Date |
|---|---|---|
| 1,288,733 | Stevens | Dec. 24, 1918 |
| 1,908,311 | Branick | May 9, 1933 |
| 2,073,510 | Bishman | Mar. 9, 1937 |
| 2,250,740 | Anderson | July 29, 1941 |

FOREIGN PATENTS

| Number | Country | Date |
|---|---|---|
| 592,558 | Great Britain | Sept. 22, 1947 |